(No Model.)
E. R. THATCHER.
BICYCLE TIRE.
No. 525,475. Patented Sept. 4, 1894.
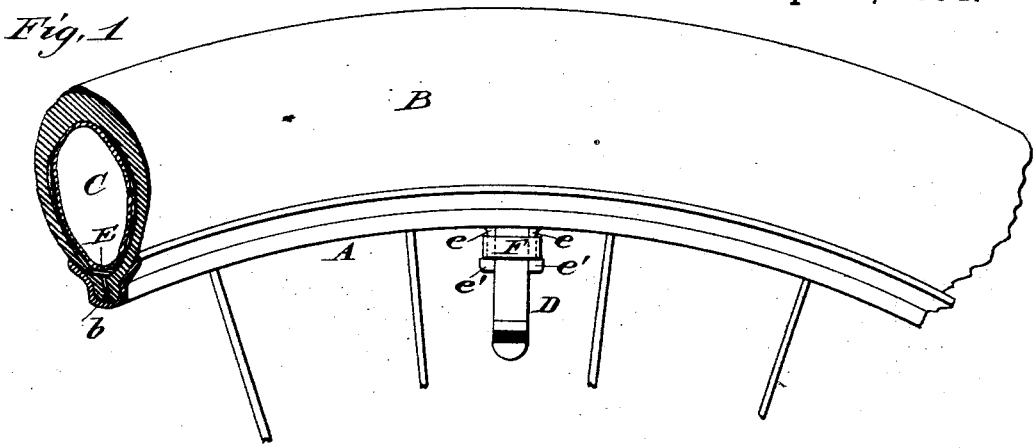
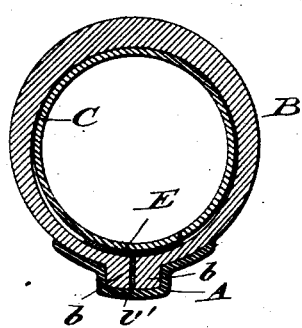
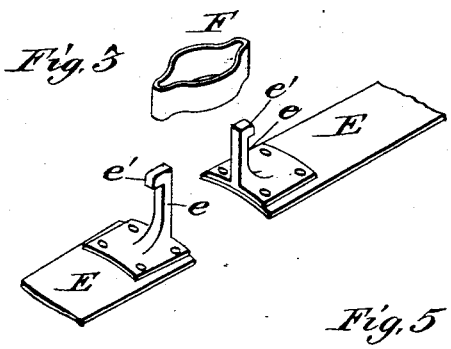
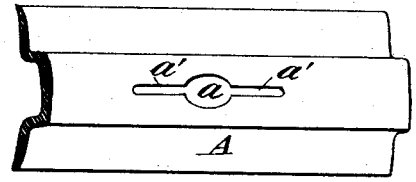
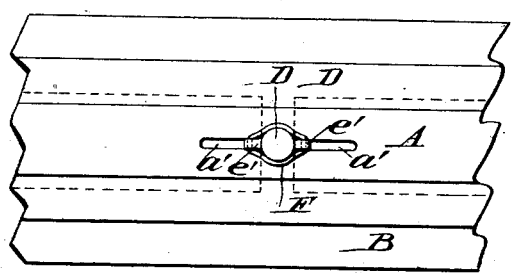
Witnesses;
Inventor
Elston R. Thatcher
by D. C. Fitzgerald
Att'y.

UNITED STATES PATENT OFFICE.

ELSTON R. THATCHER, OF MECHANICSVILLE, ASSIGNOR OF ONE-HALF TO C. E. BATDORF, OF CEDAR COUNTY, IOWA.

BICYCLE-TIRE.

SPECIFICATION forming part of Letters Patent No. 525,475, dated September 4, 1894.

Application filed June 1, 1894. Serial No. 513,176. (No model.)

*To all whom it may concern:*

Be it known that I, ELSTON R. THATCHER, a citizen of the United States, residing at Mechanicsville, in the county of Cedar and State of Iowa, have invented certain new and useful Improvements in Bicycle-Tires; and I do hereby declare the following to be a full, clear, and exact description of the invention, such as will enable others skilled in the art to which it appertains to make and use the same.

My invention relates to improvements in bicycle-tires.

The invention will first be described in connection with the accompanying drawings, and then particularly pointed out in the claim.

In the drawings—Figure 1 is a side elevation of a portion of a tire and rim illustrating my invention. Fig. 2 is a cross-section through the tire and rim. Fig. 3 is a detail view of the ends of the clamping band. Figs. 4 and 5 are detail views.

Referring to the drawings, A is a section of the rim of a bicycle which is provided with an elliptical opening $a$ from which the slots $a'$ extend, as shown in Fig. 4.

B is an outer tire casing of rubber or other suitable material. This casing is open at one side, being provided with continuous ears or ribs $b$, one on each side of the opening $v'$.

Within the outer casing or guard tube B is placed the air tube C which is provided as usual with an air valve D, or air inlet used to inflate the air tube C, as will be understood by those skilled in the art.

Inside the guard tube B is placed a clamping band E which is located between the guard tube B and the air tube C. The clamping band E is provided at each end with lugs $e$ having heads $e'$, as shown, for a purpose hereinafter described.

In assembling the parts hereinbefore described, the air tube C, and the clamping band E are placed within the casing B by stretching the latter out flat the lugs $e$ being one on each side of the air valve D and projecting through the slot opening $b'$. The assembled tire is then sprung into place on the wheel rim, the lugs $e$ being inserted through the slots $a'$ and the air valve D being passed through the opening $a$ in the rim A. A band F preferably of heavy rubber is now placed around the air valve D and around the two lugs $e$, the heads $e'$ of the latter serving to prevent the band F from slipping off accidentally.

To remove the tire, the operation is reversed.

Having thus fully described my invention, what I claim, and desire to secure by Letters Patent, is—

In a bicycle, the combination of a rim having a slot, a guard tube having an opening coincident with the slot in the rim, an air tube having an air valve projecting through the opening of the guard tube and through the slot in the rim, a clamping band arranged between the guard tube and air tube and having its ends arranged at opposite sides of the air valve of the air tube and provided with lugs which also project through the opening in the guard tube and through the slot in the rim, and an elastic band arranged around said lugs and also around the air valve, substantially as described.

In testimony whereof I affix my signature in presence of two witnesses.

ELSTON R. THATCHER.

Witnesses:
J. C. RHOADS,
A. H. MOFFIT.